(12) United States Patent
Hasegawa

(10) Patent No.: US 8,281,325 B2
(45) Date of Patent: Oct. 2, 2012

(54) COMPUTING SYSTEM INCLUDING USER PROGRAM SYSTEM EXECUTING USER PROGRAM AND LIBRARY PROGRAM SYSTEM, EXECUTING LIBRARY PROGRAMS TO BE USED IN USER PROGRAM, COMPUTING METHOD, USER PROGRAM SYSTEM, LIBRARY PROGRAM SYSTEM, AND STORAGE MEDIUM CONTAINING PROGRAM

(75) Inventor: Hidehiko Hasegawa, Yokohama (JP)

(73) Assignee: Japan Science and Technology Agency, Saitama (JP)

( * ) Notice: Subject to any disclaimer, the term of this patent is extended or adjusted under 35 U.S.C. 154(b) by 1357 days.

(21) Appl. No.: 11/667,038

(22) PCT Filed: Nov. 11, 2005

(86) PCT No.: PCT/JP2005/020716
§ 371 (c)(1),
(2), (4) Date: Oct. 25, 2007

(87) PCT Pub. No.: WO2006/051902
PCT Pub. Date: May 18, 2006

(65) Prior Publication Data
US 2008/0059974 A1 Mar. 6, 2008

(30) Foreign Application Priority Data
Nov. 11, 2004 (JP) .................................. 2004-328157

(51) Int. Cl.
*G06F 9/44* (2006.01)
(52) U.S. Cl. ........................................ 719/330; 719/319
(58) Field of Classification Search .................. 719/310, 719/319, 330
See application file for complete search history.

(56) References Cited

U.S. PATENT DOCUMENTS
6,470,380 B1 * 10/2002 Yoshizawa et al. ........... 709/213
(Continued)

FOREIGN PATENT DOCUMENTS
JP 04-007654 1/1992
(Continued)

OTHER PUBLICATIONS

Yoichiro Hata. "Sushiki Wo Shorisuru Sofuto Mo Aru" ("There is Also Software for Computer Algebra System"). Nikkei Software, Nikkei Business Publications, Inc., vol. 4, No. 11, Oct. 24, 2001, pp. 104-107.

(Continued)

*Primary Examiner* — Van Nguyen
(74) *Attorney, Agent, or Firm* — Harness, Dickey & Pierce, P.L.C.

(57) ABSTRACT

A numerical data transfer section transfers numerical data and its format as input values for computation from a user program system to a library program system, gives it a name, and registers/manages it. In addition, a computation request section transfers information on the content of the computation from the user program system to the library program system. In library program system, a computing method determining section determine the types of library programs to be used and their execution sequence on the basis of the received information on the content of the computation. A computation-result transmitting section transfers results of execution from the library program system to the user program system in accordance with a request from a user. Accordingly, the user of the user program can more easily use library programs without having to pay attention to specific processes carried out by the library program system.

15 Claims, 8 Drawing Sheets

U.S. PATENT DOCUMENTS

| | | | |
|---|---|---|---|
| 6,487,649 B1* | 11/2002 | Sedlak et al. | 711/209 |
| 8,027,925 B1* | 9/2011 | Garst et al. | 705/59 |
| 2003/0126234 A1* | 7/2003 | Shachar et al. | 709/220 |
| 2003/0182463 A1* | 9/2003 | Valk | 709/310 |

FOREIGN PATENT DOCUMENTS

| | | |
|---|---|---|
| JP | 09-101899 | 4/1997 |
| JP | 09-128352 | 5/1997 |
| JP | 10-222487 | 8/1998 |
| JP | 11-015799 | 1/1999 |
| JP | 11-039271 | 2/1999 |
| JP | 11-175485 | 7/1999 |
| JP | 2000-231478 | 8/2000 |
| JP | 2001-005666 | 1/2001 |
| JP | 2002-073578 | 3/2002 |
| JP | 2004-102507 | 4/2004 |

OTHER PUBLICATIONS

Japanese Office Action and English translation thereof.
Hidemoto Nakada et al. "GridRPC Tutorial". pp. 1-8, Apr. 26, 2007.
Zizhong Chen et al."Self Adapting Software for Numerical Linear Algebra and LAPACK for Clusters". University of Tennesse, Computer Science Department, pp. 1-24 Jan. 20, 2003.

* cited by examiner

COMPUTING SYSTEM INCLUDING USER PROGRAM SYSTEM EXECUTING USER PROGRAM AND LIBRARY PROGRAM SYSTEM, EXECUTING LIBRARY PROGRAMS TO BE USED IN USER PROGRAM, COMPUTING METHOD, USER PROGRAM SYSTEM, LIBRARY PROGRAM SYSTEM, AND STORAGE MEDIUM CONTAINING PROGRAM

TECHNICAL FIELD

The present invention relates to computing systems which contain a user program system executing user programs and a library program system executing a library program used in the user programs.

BACKGROUND ART

Conventionally, general-purpose mathematical libraries have been widely used to execute complex and massive computation, for example, in science and technology fields. A general-purpose mathematical library is a collection of subroutines for numerical computation which solve simultaneous linear equations, compute eigenvalues of a matrix, perform a spline interpolation, or solve a differential equation, to name a few examples.

Computing involving a mathematical library is basically realized by a computing system which contain a user program system executing a user program created and used by a user and a library program system executing a library program. The user embeds, in the user program, commands for the execution of the library program to use the library programs.

As described in the foregoing, the user does not need to write a complex numerical analysis program on his own if he uses a mathematical library. That relieves the user of some workload in programming for computation in science and technology fields.

A user program which, as an example, solves simultaneous linear equation $Ax=b$ on a conventional computing system consists of the following series of instructions:

```
REAL *8 A(LDA,N),B(N)
(Generate data)
Calculate: Call library
CALL LU(LDA,N,A,IERR)
CALL SOLVE(LDA,N,A,B,IERR)
(Use results)
END
```

It is assumed here that A is a matrix given in the form of a two-dimensional array A and that b is a vector given in the form of one-dimensional array B.

As shown above, the user program is arranged to specify a set of data for each execution command in the library program. Put differently, the user program is responsible for entire data management, including selection of a library program, sequence of execution, selection of data format, and intermediate results.

In addition, when the library program in the library program system is modified or a new program is added, the user of the user program needs to make changes to the content of the user program by considering these changes and additions.

The execution commands for the library program contains data format settings. Therefore, to change an input-value, not only the input value must be changed, but also the execution commands per se must be changed in accordance with the data format.

Patent document 1 (Japanese Unexamined Patent Publication 9-128352/1997 (Tokukaihei 9-128352; published May 16, 1997) describes a master processor and two or more slave processors in a parallel computer. The master processor executing a user program. The slave processors executing only routines in a library. In so doing, the slave processors first start up only once and then wait in an infinite loop. When a library is called, the master processor communicates commands and data needed for execution to the slaves for parallel execution. After that, the slaves return to the same state as before the execution, in other words, go back to an infinite loop, waiting for communications from the master processor. This arrangement reduces the slave processors' start-up overhead in the case of calling the library more repeatedly, which allows for a high speed library call on the parallel computer.

Patent document 2 (Japanese Unexamined Patent Publication 11-039271/1999 (Tokukaihei 11-039271; published Feb. 12, 1999) describes selection, and assigning to a task, of an optimal subroutine from those in a library in accordance with the data size the user wants to solve.

Non-patent documents 1 (GridRPC Tutorial; and 2 (OmniRPC: a Grid RPC system for Parallel Programming; http://www.omni.hpccjp/OmniRPC/index.htmlja) describe grid RPC (Remote Procedure Call) systems.

Patent document 3 (Japanese Unexamined Patent Publication (Tokukai) 2000-231478 (published Aug. 22, 2000) describes an arrangement in which there are provided a specification information defining section and a program generating section. The specification information defining section defines various specification information related to core mathematical expressions representing data processing, a source from which necessary data for the mathematical expression is fetched, a destination to which results of calculations are transferred, and conditions for the data processing. The program generating section generates a program that actually fetches data from the source, performs calculations, and transfers results to the destination based on the defined specification information. The provision of these sections enables automatic generation of a program that realizes the data processing in accordance with the specification information. All one has to do for the automatic generation is to define specification information including the original core mathematical expressions in a table format according to his needs.

Patent document 4 (Japanese Unexamined Patent Publication (Tokukai) 2002-073578 (published Mar. 12, 2002) describes there being provided a proxy computer that relays requests from client computers. The proxy computer contains a transfer-destination list, request transfer means, and result transfer means. In the transfer-destination list, a relationship between the types of requests issued by the client computers and the server objects to be transferred is defined in advance. The request transfer means transfers the requests issued by the client computers to the server objects contained in the transfer-destination list in accordance with the types of the requests. The result transfer means transfers results returned from the server objects to the original client computers. Patent document 5 (Japanese Unexamined Patent Publication (Tokukai) 2004-102507 (published Apr. 2, 2004) describes a system in which when the receiving section of a communications module receives, from a first object, a request for communications with a second object and data to be transmitted to the second object, a communications determining section makes an inquiry to a network device, receives a communications protocol and address information corresponding to the second object from the network device, and determines that this is to be used. Furthermore, the communications section transmits the transmission data in accordance with the communications protocol and address information determined by the communications determining section. Hence, inter-object communications are realized between the first and second objects.

DISCLOSURE OF INVENTION

The present invention has an objective of providing a computing system, computing method, user program system, library program system, program, and storage medium containing the program which enables the user of a user program to readily utilize library programs without having to know concrete processing in the library program system.

The computing method in accordance with the present invention is a computing method for a computing system containing a user program system executing a user program and a library program system executing library programs to be used in the user program. The method involves: the first transfer step of the user program system transferring process-target data which will be subjected to computation to the library program system; the second transfer step of the user program system receiving, from the library program system, process-result data representing results of the computation on the process-target data; and the computation instruction step and the computing step carried out between, and independently from, the first and second transfer steps, wherein: in the computation instruction step, the user program system instructs the library program system on content of the computation by means of a character string; and in the computing step, the library program system analyzes the character string to determine types of library programs to be used in the computation and an execution sequence of those library programs and executes the determined library programs in the determined execution sequence to carry out the computation on the process-target data.

Alternatively, the computing method in accordance with the present invention is characterized in that it is a computing method for a computing system containing a user program system executing a user program and a library program system executing library programs to be used in the user program. The method involves: the user program system carrying out: the input value transfer step of, when the user program is to implement a process for the library program system to carry out computation, implementing a process of transferring input value information on input values for the computation to the library program system; the computation request step of implementing a process of transferring, to the library program system, computation request information as information on content of the computation carried out in the library program system; and the computation-result receiving step of implementing a process of receiving, from the library program system, results of execution of the library programs in the library program system; and the library program system carrying out: the numerical data receiving step of implementing a process of receiving, from the user program system, the input value information on the input values for the computation which is used in the execution of the library programs; the computing method determining step of implementing a process of analyzing the computation request information sent from the user program system, so as to determine types of library programs to be used and an execution sequence of those library programs; and the computation-result transmitting step of implementing a process of transmitting the results of the execution of the library programs to the user program system.

According to the arrangement, the user program system executes a user program. When the user program utilizes library programs, the following three processes take place. First, the user program system transfers, to the library program system, input value information (or process-target data) on input values for a computation. Secondly, the user program system instructs the library program system on content of the computation by, for example, the user program system transferring information on the content of the computation to the library program system, so that the library program system can determine the types of library programs to be used in the computation and an execution sequence of those library programs. Thirdly, the library program system transfers results of the execution (or process-result data) to the user program system, for example, in response to a request from the user program system.

The process of transferring the input value information (process of transferring the process-target data), the process of transferring the information on the content of the computation (process of instructing on the content of the computation), and the process of transferring the results of the computation (process of transferring the process-result data) are implemented separately as above. Thus, the user program can be constructed containing separate sets of instructions for the individual processes. Therefore, the user program can be divided into segments, which facilitates making changes to the input values (process-target data) and the content of the computation. The divisibility of the user program is also useful when an error has occurred, because it becomes easier to locate where the problem has occurred.

The library program system analyzes the content of the computation which the library program system is instructed to implement. From the analysis are determined the types of library programs to be used and an execution sequence of those library programs. The library program system executes the library programs based on the determined types and sequence. The user program system hence has to inform the library program system only of what computation to execute, not of which library programs to use. Therefore, the user program does not need to consider specific processes carried out by the library program system. Thus, the user of the user program can use library programs more easily without having to know details of the processes carried out by the library program system.

Furthermore, the library program system analyzes the computation request information (or character string representing the content of the computation) so as to execute suitable library programs. The library program system is therefore compatible with the user program, in whichever programming language the program is written.

If the library programs are modified or a new library program is added, the user program end does not need to know of the changes or additions at all. The library program system end automatically use suitable library programs. In other words, if the library program system is changed, the user program does not need to be changed and is still compatible. In addition, when such a system is introduced, the old library programs can still be used as they are.

In addition, the user program system does not need to be involved in the computation executed by the library program system. That allows for reduction in size of the user program in the user program system and in the size of memory used in the user program system.

Additional objects, advantages and novel features of the invention will be set forth in part in the description which follows, and in part will become apparent to those skilled in the art upon examination of the following or may be learned by practice of the invention.

Figure 1:
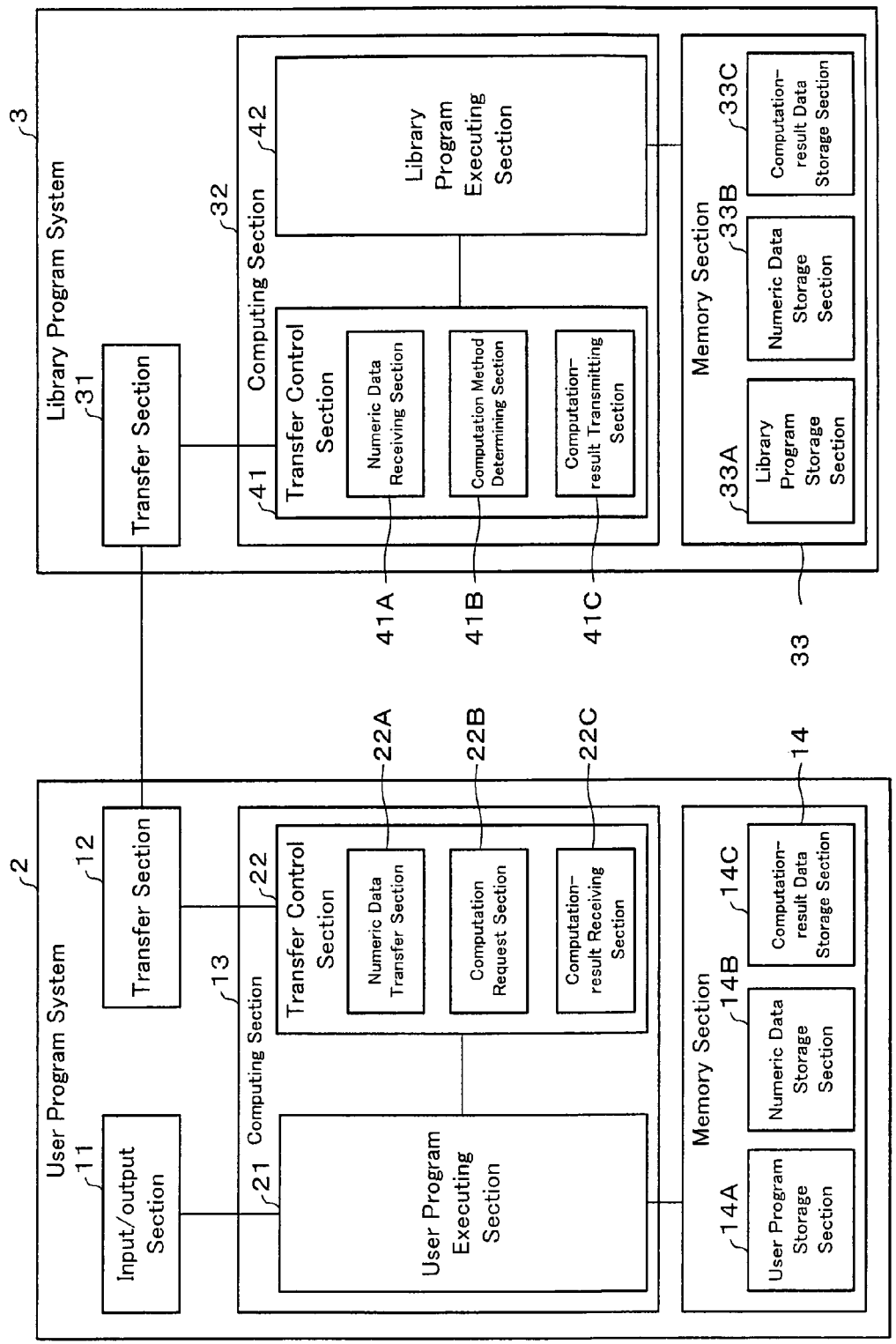
FIG. 1 is a block diagram schematically illustrating the construction of a computing system in accordance with an embodiment of the present invention.

| REFERENCE NUMERALS | |
|---|---|
| 1 | Computing system |
| 2 | User program system |
| 3 | Library program system |
| 13 | Computing section |
| 14 | Memory section |
| 14A | User program storage section |
| 14B | Numerical data storage section |
| 14C | Computation-result data storage section |
| 21 | User program executing section |
| 22 | Transfer control section |
| 22A | Numerical data transfer section (input value transfer means; first transfer means) |
| 22B | Computation request section (computation request means) |
| 22C | Computation-result receiving section (computation-result receiving means; second transfer means) |
| 32 | Computing section (computing means) |
| 33 | Memory section |
| 33A | Library program storage section |
| 33B | Numerical data storage section |
| 33C | Computation-result data storage section |
| 41 | Transfer control section |
| 42 | Library program executing section |
| 41A | Numerical data receiving section (input value receiving means) |
| 41B | Computing method determining section (computing method determining means) |
| 41C | Computation-result transmitting section (computation-result transmitting means) |

BEST MODE FOR CARRYING OUT THE INVENTION

The following will describe an embodiment of the present invention in reference to FIGS. 1 to 7.

INDUSTRIAL APPLICABILITY

FIG. 1 is a block diagram schematically illustrating the construction of a computing system 1 in accordance with the present embodiment. As shown in the figure, the computing system 1 contains a user program system 2 and a library program system 3.

The user program system 2 executes a user program create and used by a user. The user program system 2 contains an input/output section 11, a transfer section 12, a computing section 13, and a memory section 14.

The input/output section 11 receives user inputs and displays (outputs) results of the computation by the computing section 13 to the user. The transfer section 12 transmits/receives data to/from the library program system 3.

The computing section 13 carries out computation according to the user program. The computing section 13 contains a user program executing section 21 and a transfer control section 22.

The user program executing section 21 executes the user program after reading it from the memory section 14. The transfer control section 22 controls data transmission/reception processes to/from the library program system 3 when the user program being executed in the user program executing section 21 uses a library program stored in the library program system 3. The transfer control section 22 contains a numerical data transfer section (input value transfer means) 22A, a computation request section (computation request means) 22B, and a computation-result receiving section (computation-result receiving means) 22C.

When a computation is assigned to the library program system 3, the numerical data transfer section 22A transfers numerical data and its format to the library program system 3 as input values for that computation. The computation request section 22B transfers, to the library program system 3, information on the content of the computation (computation request information) to be executed in the library program system 3. The computation request information contains not execution commands for particular library programs, but a character string representing mathematical equations per se. The computation-result receiving section 22C requests the library program system 3 to transfer results of execution of the library program in the library program system 3 to receive those results from the library program system 3.

The memory section 14 is memory means which stores data used in computation by the computing section 13 and acts as work memory for the computing section 13. The memory section 14 may have an auxiliary memory function, as well as a main memory function. Also, the memory section 14 may have an external auxiliary memory device. The memory section 14 contains a user program storage section 14A, a numerical data storage section 14B, and a computation-result data storage section 14C.

The user program storage section 14A is a region for storing the user program executed by the computing section 13. The numerical data storage section 14B is a region for storing the numerical data and its format which will be transferred by the numerical data transfer section 22A. The computation-result data storage section 14C is a region for storing the results of execution received by the computation-result receiving section 22C. In actual use of the memory, there is no distinction between the numerical data storage section 14B and the computation-result data storage section 14C: the numerical data and the computation-result data are held as variables or an array in the memory section 14. The memory section 14 holds other data too: for example, numerical data required for other computations not related to the computations implemented according to the library program.

Meanwhile, the library program system 3 executes library programs in response to a request from the user program system 2. The library program system 3 contains a transfer section 31, a computing section 32, and a memory section 33.

The transfer section 31 transmits/receives data to/from the user program system 2.

The computing section 32 carries out computation according to the library program. The computing section 32 contains a library program executing section 42 and a transfer control section 41.

The library program executing section 42 executes the library program after reading it from the memory section 33. The transfer control section 41 controls data transmission/reception processes to/from the user program system 2 in response to a request from the user program system 2 when the user program being executed in the user program system 2 exploits processing by the library program system 3. The transfer control section 41 contains a numerical data receiving section (input value receiving means) 41A, a computing method determining section (computing method determining means) 41B, and a computation-result transmitting section (computation-result transmitting means) 41C.

The numerical data receiving section 41A receives, from the user program system 2, the numerical data and its format which will be, for example, input values for computation in the execution of the library program. The numerical data receiving section 41A may receive data which is not used in the execution of the library program from the user program system 2.

The computing method determining section 41B determines the library programs to be used and the sequence of execution of the programs by analyzing the computation request information sent from the user program system 2. The computation-result transmitting section 41C transmits the results of execution of the library program by the library program executing section 42 to the user program system 2 in response to a request from the user program system 2.

The memory section 33 is memory means which stores data used in computation by the computing section 32 and acts as work memory for the computing section 32. The memory section 33 may have an auxiliary memory function, as well as a main memory function. Also, the memory section 33 may have an external auxiliary memory device. The memory section 33 contains a library program storage section 33A, a numerical data storage section 33B, and a computation-result data storage section 33C.

The library program storage section 33A is a region for storing the library program executed by the computing section 32. The numerical data storage section 33B is a region for storing the numerical data and its format which are received by the numerical data transfer section 41A. The computation-result data storage section 33C is a region for storing the results of execution of the library program by the library program executing section 42. In actual use of the memory, there is no distinction between the numerical data storage section 33B and the computation-result data storage section 33C: the numerical data and the computation-result data are held as variables or an array in the memory section 33. The memory section 33 holds other data too: for example, variables as intermediate data that is temporarily used in library program computation and management information which may show a directory structure for numerical data.

Process Flow in Computing System

Figure 2:
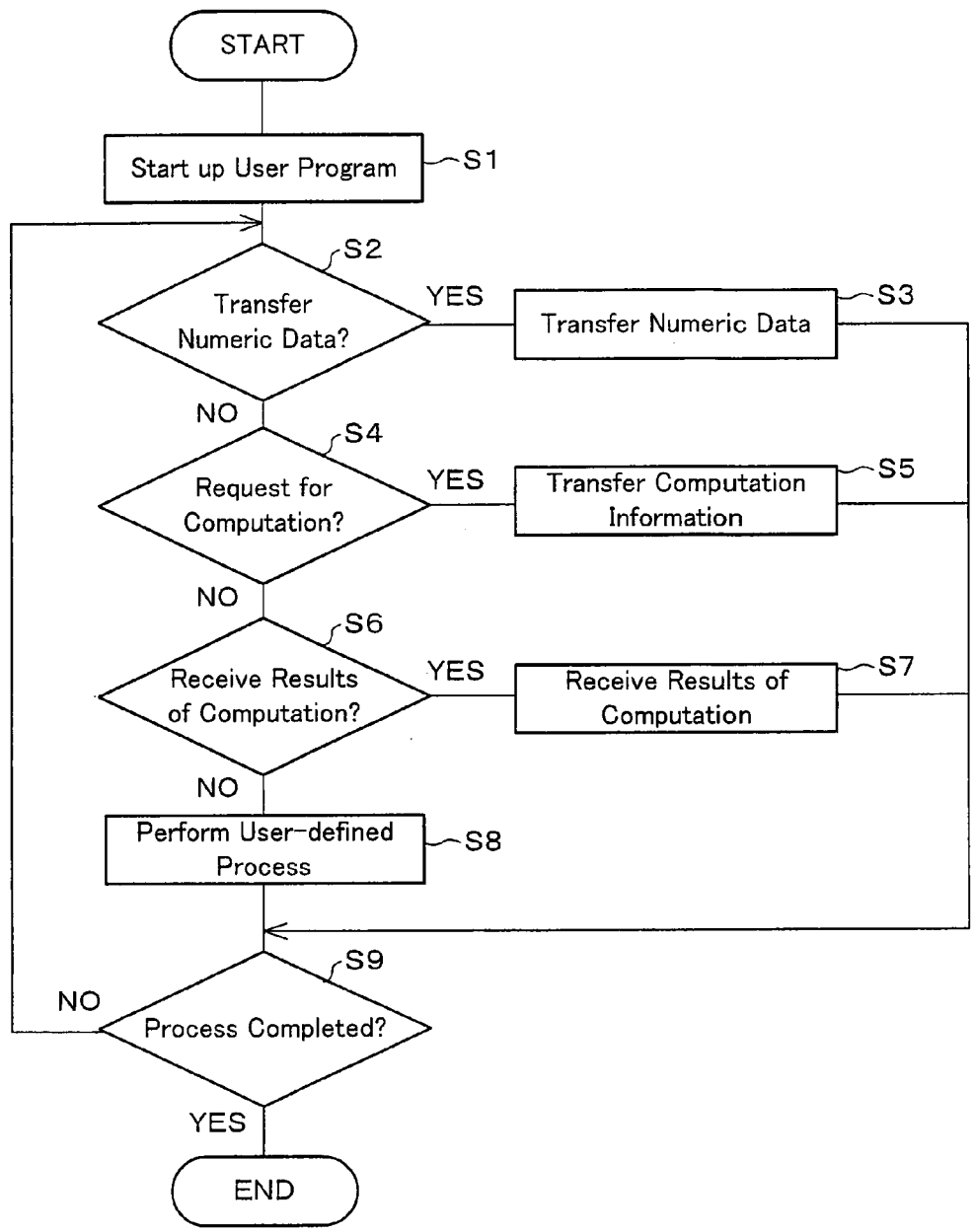
FIG. 2 is a flow chart illustrating a process flow in a user program system.
Figure 3:
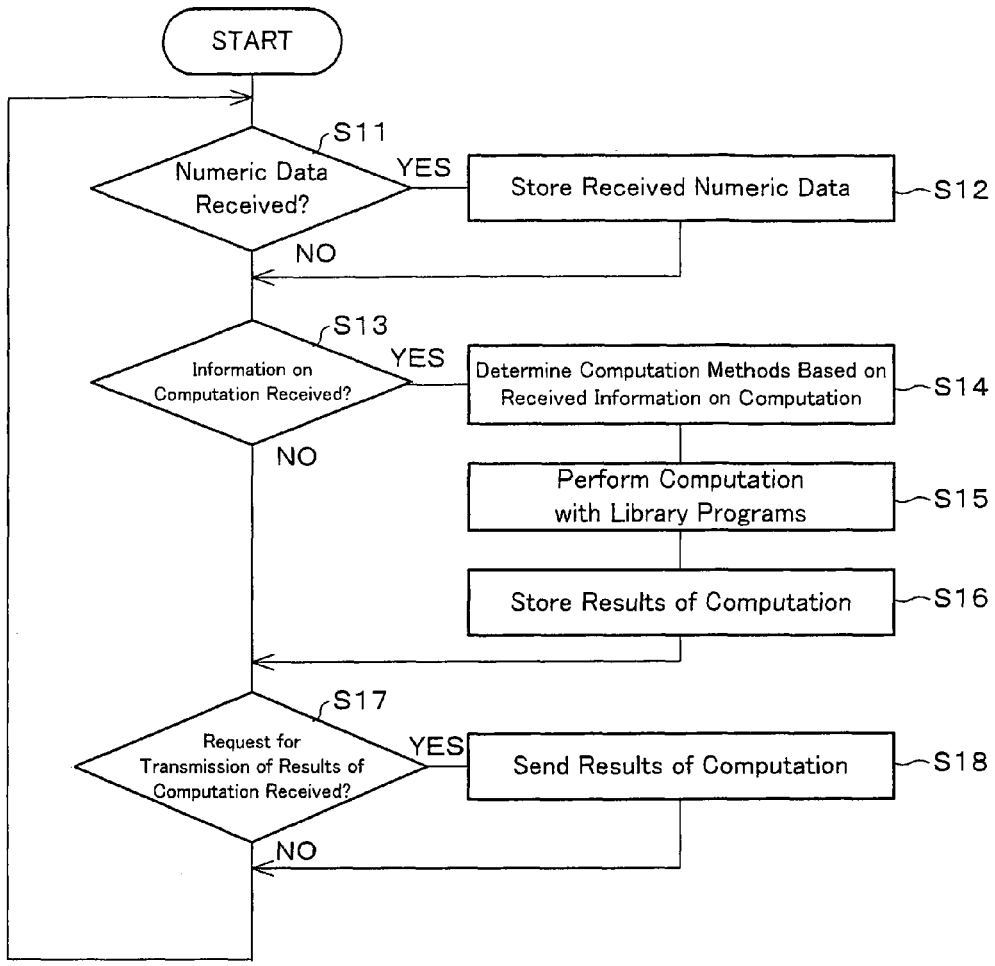
FIG. 3 is a flow chart illustrating a process flow in a library program system.

The following will describe a process flow in the computing system 1 in reference to FIGS. 2 and 3. FIG. 2 is a flow chart illustrating a process flow in the user program system 2. FIG. 3 is a flow chart illustrating a process flow in the library program system 3.

Process Flow in User Program System

First, the process flow in the user program system 2 will be described in reference to FIG. 2. In step 1 (hereinafter, "S1"), the user program executing section 21 starts up the user program in the user program system 2. More specifically, for example, as the input/output section 11 receives a predetermined execution command for a user program from the user, the input/output section 11 transfers the information to the user program executing section 21. The user program executing section 21 reads the specified user program from the user program storage section 14A of the memory section 14 to start executing the user program.

Thereafter, the user program executing section 21 executes the user program code sequentially. If the user program executing section 21 has executed a code statement for a transfer of numerical data and its format to the library program system 3 (YES in S2), the numerical data transfer section 22A controls the transfer section 12 to transfer information on the numerical data and its format to the library program system 3. The information on the numerical data and its format may be either entered by the user through the input/output section 11 or generated by the user program being executed. Accordingly, the transfer section 12 transfers the information on the numerical data and its format to the library program system 3 (S3). The numerical data transfer section 22A also stores the information on the numerical data and its format that has been transferred in the numerical data storage section 14B in the memory section 14.

If the user program executing section 21 has executed a code statement for a computation in the library program system 3 (YES in S4), the computation request section 22B controls the transfer section 12 to transfer computation request information representing computation request content to the library program system 3. The computation request information may be either entered by the user through the input/output section 11 or generated by the user program being executed. Accordingly, the transfer section 12 transfers the computation request information to the library program system 3 (S5).

If the user program executing section 21 has executed a code statement for a request for the result of the computation in the library program system 3 (YES in S6), the computation-result receiving section 22C controls the transfer section 12 to transfer a result request information to the library program system 3. The transfer section 12 may request a transfer of numerical data which was only transferred and stored in the numerical data storage section 33B without being subjected to computation. The result request information may be either entered by the user through the input/output section 11 or generated by the user program being executed. Accordingly, the transfer section 12 transfers the result request information to the library program system 3. Thereafter, when the transfer section 12 receives results of the computation from the library program system 3, the computation-result receiving section 22C stores the received results of the computation in the computation-result data storage section 14C in the memory section 14 (S7).

If the flow follows the No branch in S2, S4, or S6, the user program executing section 21 performs user-defined processes, that is, other processes in the user program (S8). In S9, the user program executing section 21 determines whether the execution of the user program is completed. If not, that is, the execution of the user program is not completed, the flow returns to and continues at S2. On the other hand, if the execution of the user program is determined to have been completed (YES in S9), the user program executing section 21 quits the user program.

S2, S4, S6, and S8 are not necessarily implemented in the above sequence; the steps may be implemented in any sequence. In other words, S3, S5, S7, and S8 may be implemented in a sequence in which the corresponding code statements are executed.

As described in the foregoing, the processes in the user program system 2 are carried out asynchronously with the processes carried out by the library program system 3.

Process Flow in Library Program System

Next, the process flow in the library program system 3 will be described in reference to FIG. 3. In S11, it is determined whether the numerical data receiving section 41A has received information on the numerical data and its format from the user program system 2 via the transfer section 31. If it is determined that the numerical data receiving section 41A has received information on the numerical data and its format (YES in S11), the numerical data receiving section 41A stores the received information on the numerical data and its format in the numerical data storage section 33B in the memory section 33 (S12).

Then, it is determined in S13 whether the computing method determining section 41B has received computation request information from the user program system 2 via the transfer section 31. If it is determined that the computing method determining section 41B has received the computation request information (YES in S13), the computing method determining section 41B analyzes the received computation request information to determine the types of library programs to be used and their execution sequence (S14).

Next, the library program executing section 42 in S15 carries out computation according to the library programs on the basis of the types of the library programs and their execution sequence determined by the computing method determining section 41B. In so doing, The library program executing section 42 reads out necessary library programs from the library program storage section 33A in the memory section 33 and also the information on the numerical data and its format as input values from the numerical data storage section 33B in the memory section 3 to carry out the computation. Thereafter, the library program executing section 42 stores the computation-result data in the computation-result data storage section 33C in the memory section 33 in S16.

In S17, it is determined whether the computation-result transmitting section 41C has received a request for a transmission of results of the computation from the user program system 2 via the transfer section 31. If it is determined that the computation-result transmitting section 41C has received a request for a transmission of results of the computation (YES in S17), the computation-result transmitting section 41C controls to read out the computation-result data from the computation-result data storage section 33C in the memory section 33 and transmit the data from the transfer section 31 to the user program system 2. Thus, the results of the computation are transmitted from the library program system 3 to the user program system 2 (S18). The computation-result transmitting section 41C may be adapted to control to read out the numerical data and its format from the numerical data storage section 33B in the memory section 33 and transmit the data and format from the transfer section 31 to the user program system 2 if the request asks for a transmission of the numerical data stored in the numerical data storage section 33B.

S11, S13, and S17 are not necessarily implemented in the above sequence; the steps may be implemented in any sequence. In other words, S12, S14 to S16, and S18 may be implemented in a sequence in which the corresponding code statements are executed.

The aforementioned conventional computing systems are briefly described here for comparative purposes. In the conventional computing systems in which the user program specifies data for each execution command for library programs, the user program should be responsible for everything about data management including the selection of library programs, the sequence in which data is written, the selection of a data format, and intermediate results. Therefore, the user program in the conventional computing systems will likely be very large and even growing in size. That makes it difficult to create libraries for distributed and parallel computing.

In this manner, in the conventional computing systems, the methods of calling library programs are dependent on individual library programs, whilst the data storage format is dependent on the user program. Therefore, the user needs to generate a user program which stores data in a suitable way for a library program that can implement desired computation and which calls the library program in a suitable way for the library program. Furthermore, in the conventional computing systems, the user needs to provide lower-level sub-programs using reverse communication. In addition, in many library program systems, a work region available for use is determined in advance; the user program needs store data in the aforementioned format using the given work region. Besides, the data storage format is often dependent not only on the content of the computation but also on the programming languages in which the library programs are written. Therefore, the library programs, even when they share similar content of the computation, in many cases, have different data storage formats if they are written in different programming languages.

In addition, when a library program in the library program system is modified or a new library program is added, the user of the user program needs to make changes to the content of the user program by considering these changes and additions.

Furthermore, the execution commands of the library programs contains data format settings. Therefore, if the user wants to change input values, he not only needs to change the input values but also needs to change the execution commands in accordance with the data format.

In this manner, in the conventional computing systems, the user program is dependent on the library programs at source level. The user program needs many changes to change the library program.

In contrast, the computing system 1 in accordance with the present embodiment, as mentioned earlier, implements the first transfer step (S3) in which the user program system 2 transfers numerical data and its format as process-target data which will be subjected to computation to the library program system 3 and the second transfer step (S18) in which the user program system 2 receives numerical data and its format as process-result data representing results of the computation on the process-target data from the library program system 3. Furthermore, the computation instruction step (S5) and the computing step (S14 to S16) are implemented between the first transfer step and the second transfer step and independently from these steps.

Furthermore, the computation request information transmitted in S5 from the user program system 2 to the library program system 3 contains a character string representing the content of the computation (for example, a character string representing mathematical equations per se). In addition, in S14 to S16, the library program system 3 determines the types of library programs to be used in the computation and their execution sequence by analyzing the computation request information containing that character string and performs the computation on the process-target data by executing the determined library programs in the determined execution sequence.

Figure 9:
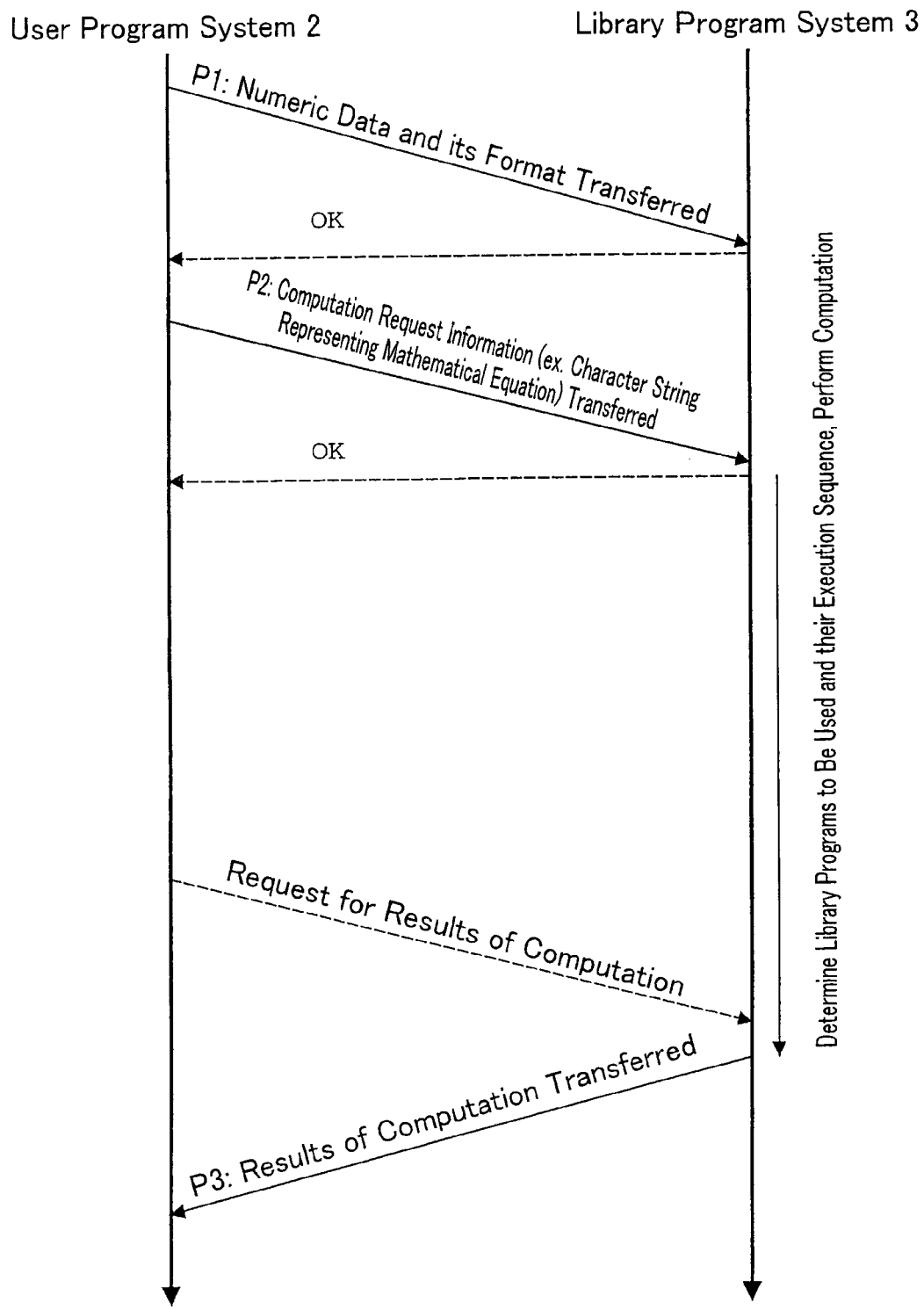
FIG. 9 is an illustration of an example of the data sequence between a user program system and a library program system.

In this manner, in the computing system 1 in accordance with the present embodiment, as shown in FIG. 9, the process, P1, of transferring the process-target data (transfer of the numerical data), the process, P2, of instructing on the content of the computation (transfer of computation request information), and the process, P3, of transferring of the process-result data (transfer of the results of the computation) are separately carried out. Thus, the user program can be constructed containing separate sets of instructions for the individual processes.

Therefore, the user program can be divided into segments, which facilitates making changes to the process-target data and the content of the computation. The divisibility of the user program makes it easier to locate a problem when there occurs an error.

As indicated by broken lines in FIG. 9, upon receiving a transfer of the process-target data and instructions on the content of the computation, the library system 3 in accordance with the present embodiment returns an acknowledgement (OK) to the user program system 2 and starts the transfer of the process-result data in accordance with a request for the results of computation from the user program system 2. If there occurs an error, the library system 3 returns an error message to the user program system 2.

The library program system 3 analyzes the character string representing the content of the computation and determines the types of library programs to be used and their execution sequence, on the basis of which the library program system 3 executes the library program.

Thus, in making instructions on the content of the computation, the user program system 2 needs only to simply transmit the character string representing the content of the computation to the library-program system 3; the user program system 2 does not have to instruct on which library programs to use.

Furthermore, the user program system does not need to be involved in the computation executed in the library program system. That allows for reduction in size of the user program which is executed in a different memory space from the memory space in which the library program is executed. That also reduces the memory consumption in the user program system.

In addition, the library program system 3 determines the types of library programs and their execution sequence as above. Therefore, the character string representing information on the content of the computation can be written in any syntax that is not bounded by the following programming languages: i.e., the programming language in which those parts of the user program which implement the transfer of the process-target data and the process-result data are written and the programming languages in which the library programs are written.

As a result, the dependency of one of the processes of transferring the process-target data, instructing on the content of the computation, and transferring the process-result data on another process is reduced. In addition, the dependency of the instruction process for the content of the computation on the computation performed actually by the library program system 3 can be reduced. Accordingly, a change in any of the above processes will not likely affect another process, which makes it easier to use the library programs.

To describe it in more detail, since the library program system 3 determines the type of the library programs and their execution sequence as above, the user program does not need to consider specific processes carried out by the library program system 3. Therefore, the user of the user program can more easily use the library programs without having to know details of the processes carried out by the library program system 3.

If the library programs are modified or a new library program is added, the library program system 3 automatically selects suitable library programs. In addition, the hardware of the library program system 3 is changed to include more available processors, the library program system 3 is able to automatically select suitable library programs in accordance with the number of the processors.

In this manner, even if the library program system 3 is changed, the user program does not need to be changed and is still compatible. Thus, the user program end does not need to recognize changes and modifications of the library programs at all, which makes it easier to use the library programs. In addition, when such a system is introduced, the old library programs can still be used as they are.

In this manner, the hardware and library programs of the library program system 3 can be easily updated. That allows for relatively easy introduction of new technology to the library program system 3. Examples of the introduction of new technology include application of a new algorithm to a library program, improvement of the precision of a library program, guaranteeing accuracy, modifying a library program for fault tolerance, automatic optimization of the performance of a library program, and realization of a library program compatible with distributed and parallel processing.

Furthermore, even if the programming languages are changed, the user of the user program can make a request with the library program system for computation without changing the character string representing the content of the computation. That further makes it easier to use the library programs.

Furthermore, the library program system 3 in accordance with the present embodiment determines the library programs to be used for computation, the behavior of the library programs, and the execution sequence of the library programs in reference to the data format transmitted together with the process-target data (numerical data), in addition to the results of the analysis of the character string (computation request information). The data structure may be, for example, the same as the process-target data or when the process-target data is given as an array, the number of array elements and the dimension of the array. Instead of referring to the data format received from the user program system 2, the library program system 3 may obtain the data structure of the process-target data by analyzing the data structure of the process-target data so as to refer to the results of the analysis.

In this arrangement, the data format of the process-target data is transferred as input value information to the library program system 3. Otherwise, the library program system 3 obtains the data format of the process-target data by analyzing the data structure of the process-target data. The information on the content of the computation does not need to include information on the data format of the numerical data.

In addition, if the data format of the process-target data is changed, the library programs to used in the computation, the behavior of the library programs, and the execution sequence of the library programs are changed in accordance with the change of the data format without changing the character string representing (computation request information) the content of the computation.

That readily enables combining user programs designed for different data formats. Also, the process-target data and the content of the computation can be readily changed when compared with an arrangement in which when the data structure of the process-target data is changed, the instruction for computing in the library program system is changed in accordance with the change.

SYSTEM CONSTRUCTION EXAMPLE 1

Figure 4:
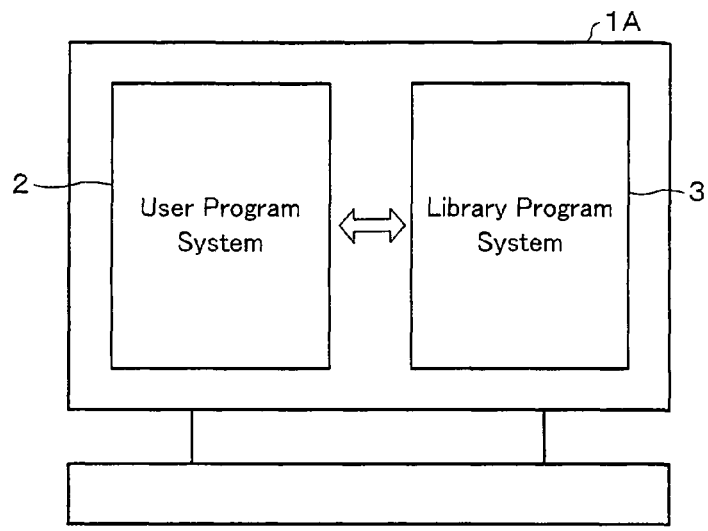
FIG. 4 is a block diagram illustrating a construction example for a single computer executing both a user program system and a library program system.

Next, a concrete example of the construction of the computing system 1 will be described. System construction example 1 discussed here is adapted to execute both the user program system 2 and the library program system 3 on one computer 1A, as shown in FIG. 4.

The computer 1A is an ordinary computer which contains a CPU (central processing unit) as computation means, a RAM (random access memory) as main memory means, a ROM (read only memory) or a hard disk as non-volatile memory devices, and other components. The functional blocks of the computing section 13 in the user program system 2 and the functional blocks of the computing section 32 in the library program system 3 are realized by the CPU executing the programs loaded, for example, from the hard disk to the RAM. The memory section 14 is realized by the RAM, the hard disk, etc.

The transfer section 12 in the user program system 2 and the transfer section 31 in the library program system 3 exchange data between the programs in the computing section 13 and the program in the computing section 32, in other words, perform inter-process communications. The input/output section 11 is realized by, for example, input means, such as a keyboard or a mouse, a display as display means, and a printer as printing means which are all parts of the computer 1A.

The computer 1A may include a plurality of processors so that it is capable of parallel computation.

CONCRETE EXAMPLE OF OPERATION OF SYSTEM CONSTRUCTION EXAMPLE 1

Next, a concrete example of the operation of system construction example 1 will be described. The example of operation is as follows. The user program in the user program system 2 contains a command to solve a simultaneous linear equation, $Ax=b$. Computation on the simultaneous linear equation $Ax=b$ is carried out in the library program system 3. To describe it in detail, a coefficient matrix A is stored in a two-dimensional array of a double-precision type declared in A(LDA,N), and a vector b is stored a one-dimensional array of a double-precision type declared in B(N). The solution vector x of the simultaneous linear equation $Ax=b$ is stored in a one-dimensional array of a double-precision type declared in SOL(N).

The process flow in the above operation example is as follows. First, the computing section 32 in the library program system 3 is activated. Next, the computing section 13 in the user program system 2 starts executing a particular user program in response to, for example, an command input from the user.

Thereafter, The numerical data and its format to be used as input values for the computation performed in the library program system 3 are generated during the course of execution of the user program. In this operation example, the coefficient matrix A and the vector b are generated as the numerical data and its format. The generated coefficient matrix A and vector b are stored as the array A and the array B in the numerical data storage section 14B.

Thereafter, the user program executing section 21 executes the following statements of the user program:

CALL PUT('A',LDA,N,A,IEER)
CALL PUT('b',N,B,IERR)

The statements are instructions for a transmission of the array A in which the coefficient matrix A is stored and the array B in which the vector b is stored to the library program system 3. The instruction "PUT" is not necessarily written in this character string; another character string may be used to specify the same instruction.

As the statements are executed by the user program executing section 21, the numerical data transfer section 22A controls the transfer section 12 to transfer the array A and the array B to the library program system 3. Accordingly, the transfer section 12 transfers the array A and the array B to the library program system 3.

In the library program system 3, the numerical data receiving section 41A receives the array A and the array B which are stored as the coefficient matrix A and the vector b in the numerical data storage section 33B.

Next, the user program executing section 21 executes the next statement of the user program.

CALL SILC('x=A¥b')

The statement is an instruction for the library program system 3 to solve the simultaneous linear equation $Ax=b$ as computation request information. The instruction "SILC" is not necessarily written in this character string; another character string may be used to specify the same instruction. In response to the instruction, the library program system 3 executes the computation. The user program system 2 proceeds to a next statement without waiting for the computation in the library program system 3 to finish.

In the library program system 3, the computing method determining section 41B receives the computation request information and analyzes the received computation request information to determine the types of library programs to be used and their execution sequence.

Specifically, in a case where the computing method determining section 41B is given, as an example, a character string containing an operator and an operand as the computation request information, the computing method determining section 41B analyzes the character string to identify the operator and the operand and determine the library programs to be used from the form of the operand and the type of the operator. For example, the computing method determining section 41B has stored the relationship between each combination of the form of the operand and the type of the operator for which a request can be received and a library program (or a combination of library programs) used for that combination. Thus, the computing method determining section 41B determines the library program (or the combination of library programs) which corresponds to the combination of the form of the operand and the type of the operator for which a request is received as the library program(s) to be used. An API (Application Programming Interface) which allows changes to be made to the relationship is provided ready for use in the library program system 3. As the API is instructed by the user (operator) to change the relationship in the library program system 3 when a library program is updated for a new version, for example, the library program system 3 is capable of change the relationship in accordance with the instruction.

If the character string contains more than one operator, the computing method determining section 41B determines an execution sequence for the operators by analyzing the character string and determines as the execution sequence for the library programs. Furthermore, the computing method determining section 41B instructs the library program executing section 42 to execute the determined library programs by, for example, generating a statement according to which the library programs whose types and execution sequences have been decided as above are executed and sending the statement to the library program executing section 42. If two operations are to be done either of which can be carried out first, and the library program system 3 has judged that there is more than one processor available, the computing method determining section 41B may instruct the processors to perform parallel execution of the library program corresponding to the operations.

The computing method determining section 41B may monitor the execution of the library programs for an end of the execution by, for example, monitoring a flag which is set by a member (for example, the library program executing section 42) that executes the library programs when the execution of the library programs ends, so that the computing method determining section 41B can decide which library program to execute next in accordance with whether the execution of the library programs has ended. Accordingly, for example, even if the library program system 3 includes two or more processors (members executing the library programs) which differ from each other in the capability of executing the library programs of the member and the times it takes to execute the library programs cannot be determined in advance, the library program to be executed next can be determined in a suitable manner without any trouble at all.

In a case where 'x=A¥b' has been received as computation request information as above, as an example, the computing method determining section 41B generates a next statement on the basis of the received computation request information ('x=A¥b').

---

CALL LU(LDA,N,A1,IP,IERR)
x ← b
CALL SOLVE(LDA,N,A1,IP,x,IERR)

---

The first line of the statement indicates an LU decomposition, the second line a substitution, and the third line a forward and backward substitution. In this statement, the computing method determining section 41B, for example, assigns defined A to A1 which has been converted to suit the program (actually, A is copied to A1) and assigns x and IP as intermediate variables. A1, IP, and x are variables used only in the library program system 3.

The library program executing section 42 executes the library programs on the basis of the computation determined by the computing method determining section 41B to solve for the solution x. The obtained solution is stored as computation-result data in the computation-result data storage section 33C.

Thereafter, in the user program system 2, the user program executing section 21 executes a next statement of the user program.

CALL GET('x',N,SOL,IERR)

The statement indicates an instruction to receive the solution x as the result of the computation from the library program system 3 and store the solution x in the array SOL. The instruction "GET" is not necessarily written in this character string; another character string may be used to specify the same instruction.

As the statement is executed, the computation-result receiving section 22C controls the transfer section 12 to transfer the statement as result request information to the library program system 3. Accordingly, the transfer section 12 transfers the result request information to the library program system 3.

In the library program system 3, the computation-result transmitting section 41C receives the result request information and reads the computation-result data requested by the result request information from the computation-result data storage section 33C. The computation-result transmitting section 41C controls a transmission of the computation-result data readout from the transfer section 31 to the user program system 2. Accordingly, the result of the computation is transmitted from the library program system 3 to the user program system 2. If the library program system 3 has not completed the computation by the time the result request information is received, no computation-result data is transmitted until the computation is completed.

In the user program system 2, as the computation-result receiving section 22C receives the computation-result data from the library program system 3, stores the solution x as the computation-result data in the form of the array SOL in the computation-result data storage section 14C. That completes the computation using the library program system 3.

Thereafter, as the execution of the user program is completed, the library program system 3 clears the data stored in the numerical data storage section 33B and the computation-result data storage section 33C and stops the operation of the computing section 32. The library program system 3 may clear the data and stop the operation of the computing section 32 when the user program no longer needs to use the library program system 3.

In addition, the user program system 2 may execute a new user program. In so doing, data may sent from the previous user program to the new user program via the library program system 3.

A statement "CALL SILC('Z=X+Y;C=A−B')" may be included in the user program as an instruction on the user computation request information. When this is the case, for example, the computation for "Z=X+Y" and the computation for "C=A−B" can be performed in a parallel manner if the library program system 3 is capable of parallel computation. In addition, the user program system 2 may execute a next instruction even if the two computations have not been completed in the library program system 3. In other words, in cases like this, three computations are carried out in a parallel manner, which increases processing speed. In addition, the parallel processing is executed without the user program knowing it.

The above description has dealt with the computation request information being given as a character string representing an equation as an example. This is by no means intended to be limiting the invention. Another character string (for example, a character string representing a control syntax) may be contained in addition to an equation. In addition, the computation request information may be a character string representing something that is not an equation (text base) or data given in a non-character-string form. In any case, the computation request information is information on the content of the computation, similar effects as described above are achieved: for example, the user program does not need to consider specific processes carried out by the library program system because the library program system 3 determines the types of the library programs and their execution sequence.

However, the character string is easily understood and edited by the user; it is desirable that the computation request information contains a character string. Especially, since equations are widely used, the user can readily understand their meanings and edit them, unlike newly defined syntaxes. Therefore, it is especially preferable that the computation request information contains at least a character string representing an equation.

Even if the computation request information is written in the form of a character string, as mentioned earlier, the character string representing information on the content of the computation can be written in any syntax that is not bounded by the following programming languages: i.e., the programming language in which those parts of the user program which implement the transfer of the process-target data and the process-result data are written and the programming languages in which the library programs are written. As a result, even if the programming languages are changed, the user of the user program can make a request with the library program system for computation without changing the character string representing the information on the content of the computation. That further facilitates the use of the library programs.

In addition, basically, the library program system 3 determines library programs to be used. However, if the computation request information from the user program contains information specifying library programs to be used, the library program system 3 may uses those specified library programs. When this is actually the case, the user is allowed to use a particular library program for a particular process, thereby being capable of instructing a suitable process to the library program system 3. Even in that case, the same effects are achieved if the library program system 3 is capable of determine library programs to be used in computation when the computation request information contains no information specifying library programs.

SYSTEM CONSTRUCTION EXAMPLE 2

Figure 5:
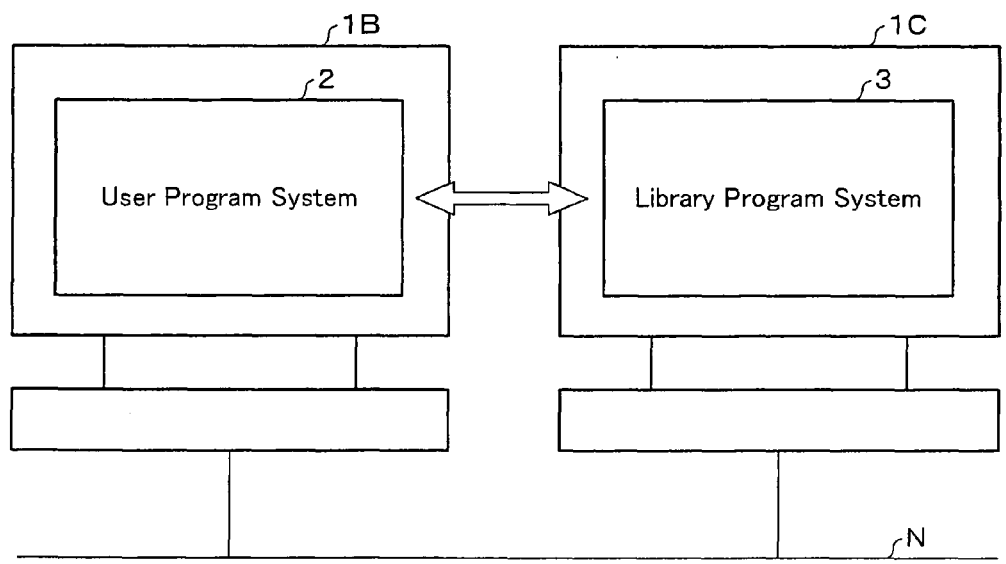
FIG. 5 is a block diagram illustrating a construction example for two computers being connected over a communications network, one of them executing a user program system and the other executing a library program system.

Next, another concrete example of the construction of the computing system 1 will be described. System construction example 2 discussed here is adapted to execute the user program system 2 on a computer 1B and the library program system 3 on a computer 1C, the computers 1B and 1C being connected over a communications network N as shown in FIG. 5.

Each of the computer 1B and the computer 1C is an ordinary computer which contains a CPU as computation means, a RAM as main memory means, a ROM and a hard disk as non-volatile memory devices, and other components. The functional blocks of the computing section 13 in the user program system 2 and the functional blocks of the computing section 32 in the library program system 3 are realized by the CPU executing the programs loaded, for example, from the hard disk to the RAM. The memory section 14 is realized by the RAM, the hard disk, etc.

The transfer section 12 in the user program system 2 and the transfer section 31 in the library program system 3 function as a communication interface for communications over the communications network N. The input/output section 11 is realized by, for example, input means, such as a keyboard or a mouse, a display as display means, and a printer as printing means which are all parts of the computer 1B.

The computer 1B and the computer 1C may each include a plurality of processors so that they are capable of parallel computation.

CONCRETE EXAMPLE OF OPERATION OF SYSTEM CONSTRUCTION EXAMPLE 2

System construction example 2 differs from system construction example 1 only in that the user program system 2 and the library program system 3 are run on different computers. The two examples basically operate in the same manner. In other words, the concrete example of the operation of system construction example 2 is substantially the same as the concrete example of the operation of system construction example 1 discussed above. Differences are found where the data transfer between the transfer section 12 and the transfer section 31 takes place over the communications network N.

SYSTEM CONSTRUCTION EXAMPLE 3

Figure 6:
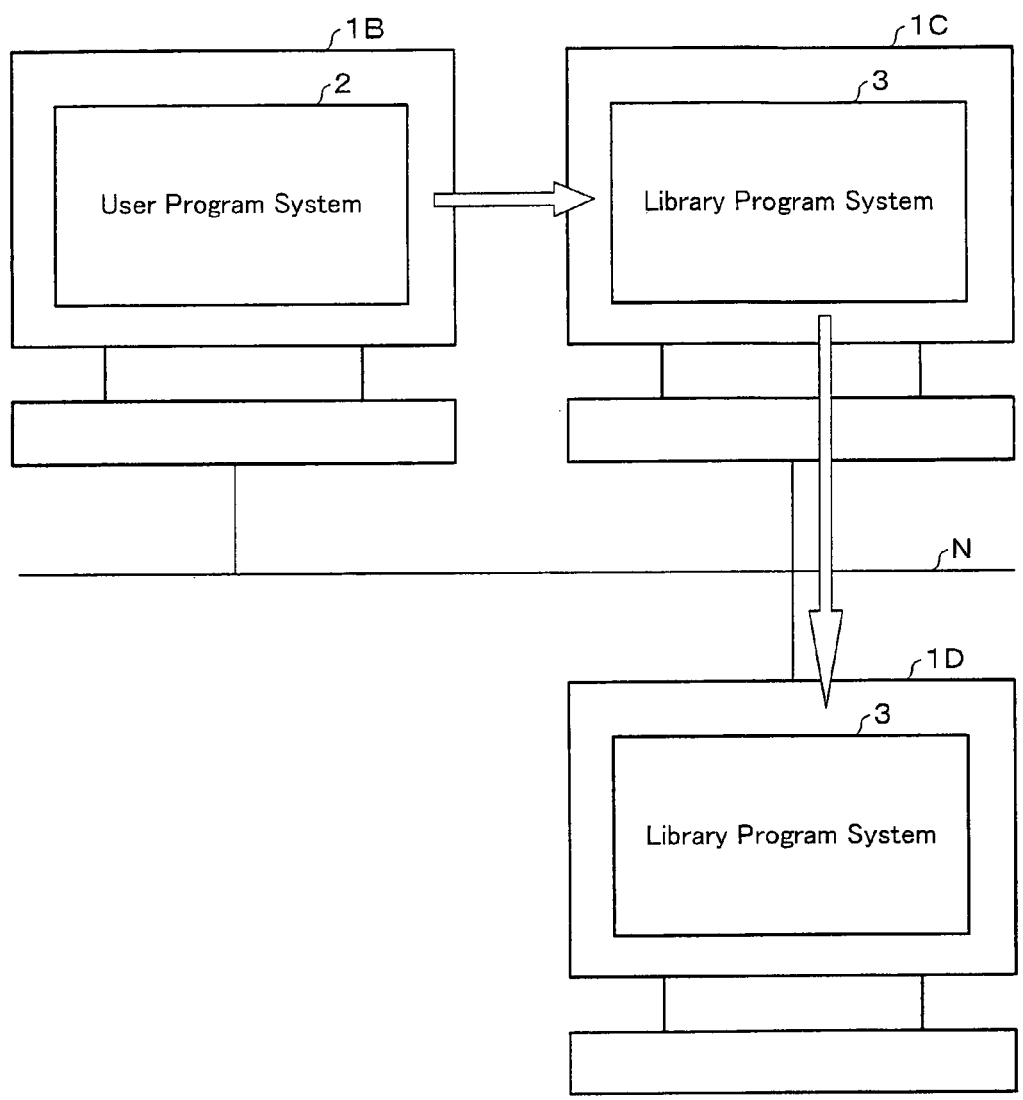
FIG. 6 is a block diagram illustrating a construction example for three or more computers being connected over a communications network, one of them executing a user program system and the others executing a library program system.
Figure 7:
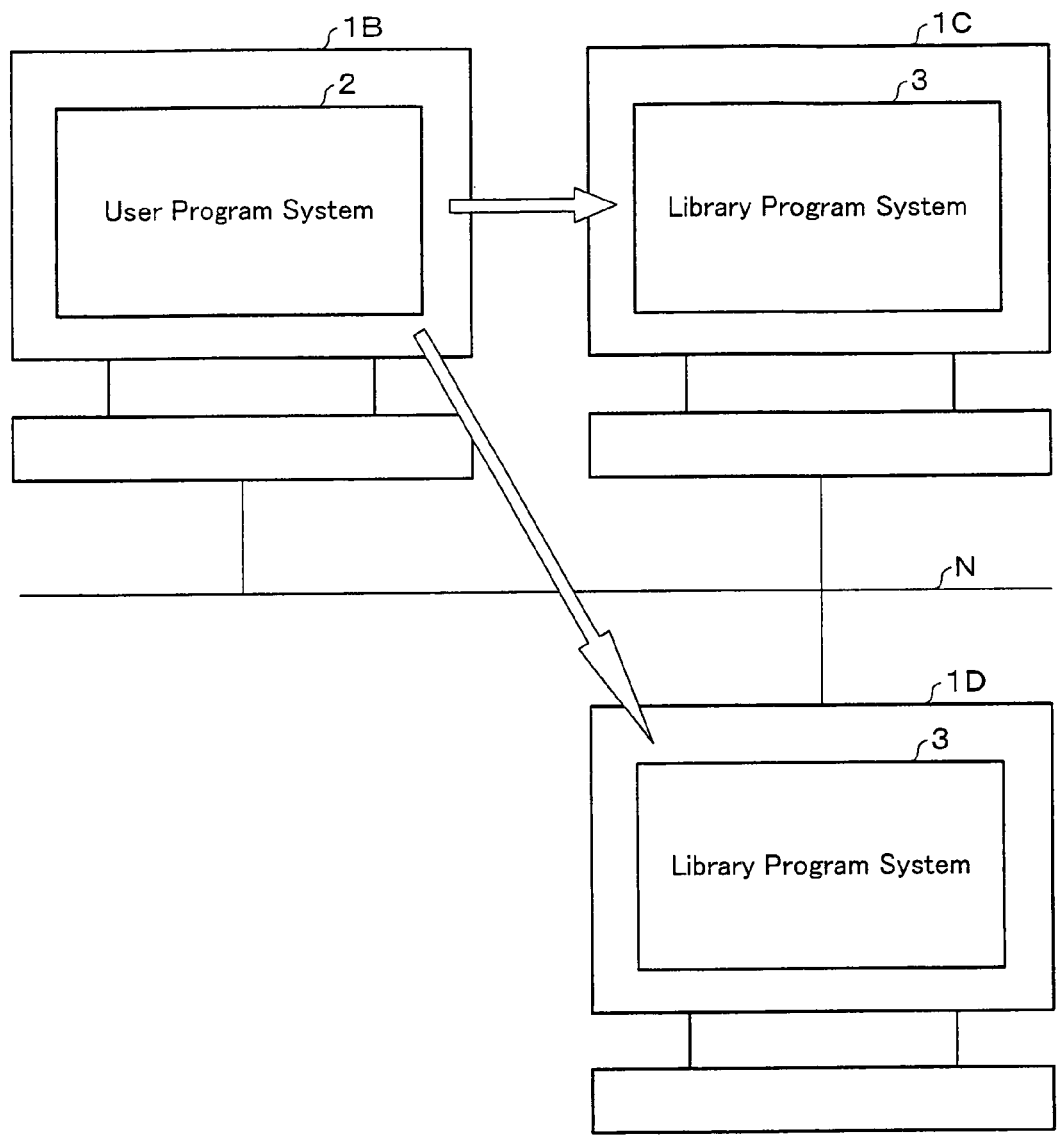
FIG. 7 is a block diagram illustrating another example of the construction of three or more computers being connected over a communications network, one of them executing a user program system and the others executing a library program system.

Next, a further concrete example of the construction of the computing system 1 will be described. System construction example 3 discussed here is adapted to execute the user program system 2 on a computer 1B and the library program system 3 on a computer 1C and a computer 1D, the computers 1B, 1C, and 1D being connected over a communications network N as shown in FIGS. 6 and 7. In other words, system construction example 3 differs from system construction example 2 in that there are two computers executing the library program system 3. The construction example shown in FIGS. 6 and 7 has two computers executing the library program system 3. Alternatively, there may be three or more computers.

Each of the computer 1B, the computer 1C, and the computer 1D is an ordinary computer which contains a CPU as computation means, a RAM as main memory means, a ROM and a hard disk as non-volatile memory devices, and other components. The functional blocks of the computing section 13 in the user program system 2 and the functional blocks of the computing section 32 in the library program system 3 are realized by the CPU executing the programs loaded, for example, from the hard disk to the RAM. The memory section 14 is realized by the RAM, the hard disk, etc.

The transfer section 12 in the user program system 2 and the transfer section 31 in the library program system 3 function as a communication interface for communications over the communications network N. The input/output section 11 is realized by, for example, input means, such as a keyboard or a mouse, a display as display means, and a printer as printing means which are all parts of the computer 1B.

The computers 1B, the computer 1C, and the computer 1D may each include a plurality of processors so that they are capable of parallel computation.

System construction example 3 is realized by parallel computers, SMPs (symmetric multiprocessors), cluster computers, etc. when the computer 1B is located relatively close to the computers 1C and 1D, and the computers 1C and 1D have close computation speeds and by grid computing or the like when the computer 1B is located relatively far from the computers 1C and 1D, and the computers 1C and 1D have different computation speeds.

CONCRETE EXAMPLE OF OPERATION OF SYSTEM CONSTRUCTION EXAMPLE 3

System construction example 3 differs from system construction example 2 in that there is more than one library program system 3 being used by the user program system 2. In other words, system construction example 3 allows for a plurality of the library program systems 3 share the execution of the library programs used by the user program. Therefore, in system construction example 3, it needs to be considered how to allocate processing to the library program systems 3. In system construction example 3, one of the library program systems 3 decides on a process allocation method. There are two possible behaviors for the user program system 2. In the first method, the user program system 2 communicates with one of the library program systems 3. In the second method, the user program system 2 inquires one of the library program systems 3 for an allocation method and communicates with a plurality of library program systems 3 based on the results.

First, the method will be described in which the user program system 2 communicates with one of the library program systems 3. In a case like this, the user program system 2 transfers numerical data and its format to the library program system 3 in the computer 1C as shown in FIG. 6. The library program system 3 in the computer 1C then determines how to share processing with the library program system 3 in the computer 1D and transfers to the computer 1D the numerical data and its format needed in the computation by the computer 1D. Next, the user program system 2 requests the library program system 3 in the computer 1C to carry out computation using a library program. The library program system 3 in the computer 1C determines how to share the processing with the library program system 3 in the computer 1D, and the library program systems 3 in the computer 1C and the computer 1D carry out the processing based on the results. In some kinds of computation, the numerical data and its format in the computers 1C and 1D may be relocated between the two computers prior to processing.

Similarly to system construction example 1 explained above, the user program system 2 transmits numerical data, computation request information, and a request for a transmission of results of computation to the library program system 3 in the computer 1C. Meanwhile, the library program system 3 in the computer 1C determines how to share the processing with the computer 1D on the basis of the numerical data received from the user program system 2. The library program systems 3 in the computers 1C and 1D carries out the processing in accordance with the sharing method for the numerical data or the sharing method suited for computation.

Specifically, first, upon receiving the numerical data and its format from the user program system 2, the numerical data receiving section 41A temporarily stores the numerical data in the numerical data storage section 33B. Thereafter, the numerical data and its format are transferred to the library program system 3 in the computer 1D according to a standard numerical data sharing method based on the format of the numerical data and stored in the numerical data storage section 33B. Upon receiving the computation request information from the user program system 2, the computing method determining section 41B analyzes the computation request information and determines how to share the processing with the computer 1D. In so doing, the numerical data is transferred to change the sharing of the numerical data and its format between the computer 1C and the computer 1D if necessary.

Thereafter, in the library program system 3 in the computer 1C, the library program executing section 42 executes its share of the computation and stores computation-result data in the computation-result data storage section 33C. Also in the library program system 3 in the computer 1D, the library program executing section 42 executes its share of the computation and stores computation-result data in the computation-result data storage section 33C. When the library program system 3 in the computer 1C receives a request for the results of the computation from the user program system 2, the results of the computation performed by the library program system 3 in the computer 1D is first transferred to the library program system 3 in the computer 1C.

The library program system 3 in the computer 1C then obtains ultimate results of computation on the basis of the results of the computation performed by the computer 1C and the results of the computation performed by the computer 1D and controls the computation-result transmitting section 41C to transmits the ultimate results to the user program system 2.

The sequence in which the numerical data and the results of the computation are transmitted/received is by no means limited to the sequence discussed above. The transmission/reception may take place at any timing.

Owing to the above processing, the user program itself does not at all need to know the method of using the library program systems 3. The user is allowed to create user programs without paying attention to differences between systems.

Next, the method will be described in which the user program system 2 inquires one of the library program systems 3 for an allocation method and communicates with a plurality of library program systems 3 based on the results. In a case like this, as shown in FIG. 7, the user program system 2, upon a transfer of numerical data to the library programs, inquires the library program system 3 in the computer 1C about how to share the processing between the library program system 3 in the computer 1C and the library program system 3 in the computer 1D. In response to the inquire, the library program system 3 in the computer 1C calculates a sharing method for the numerical data and its format and transmits a result to the user program system 2. The user program system 2 transfers the numerical data and its format to the library program system 3 in the computer 1C and the library program system 3 in the computer 1D on the basis of the received sharing method.

Specifically, as being notified first of a transmission of the numerical data and, its format from the user program system 2, the standard sharing method corresponding to the numerical data and its format is transmitted to the user program system 2. On the basis of the sharing method, control is carried out so that the numerical data to be stored in the library program system 3 in the computer 1C is transferred to the library program system 3 in the computer 1C and that the numerical data to be stored in the library program system 3 in the computer 1D is transferred to the library program system 3 in the computer 1D. As the library program system 3 receives the numerical data and its format from the user program system 2, the numerical data receiving section 41A stores the numerical data in the numerical data storage section 33B.

Thereafter, upon receiving computation request information from the user program system 2, the computing method determining section 41B analyzes the computation request information to determine how to share processing with the computer 1D. In so doing, the numerical data is transferred to change the sharing of the numerical data between the computer 1C and the computer 1D if necessary.

Thereafter, in the library program system 3 in the computer 1C, the library program executing section 42 executes its share of the computation and stores computation-result data in the computation-result data storage section 33C. Also, in the library program system 3 in the computer 1D, the library program executing section 42 executes its share of the computation and stores computation-result data in the computation-result data storage section 33C.

When the library program system 3 in the computer 1C receives a request for the results of the computation from the user program system 2, the sharing method for the results of the computation is transmitted to the user program system 2. On the basis of the sharing method, the user program system controls so as to issue a request for a transfer of the results of the computation stored in the library program system 3 in the computer 1C and the results of the computation stored in the library program system 3 in the computer 1D. In the user program system 2, the computation-result receiving section 22C receives the results of the computation from the computer 1C and the computer 1D and stores the results of the computation carried out using the library programs in the computation-result data storage section 14C.

Owing to the above processing, the user program itself does not at all need to know the method of using the library program system 3, similarly to method (1) above. The user is allowed to create user programs without paying attention to differences between systems.

Figure 8:
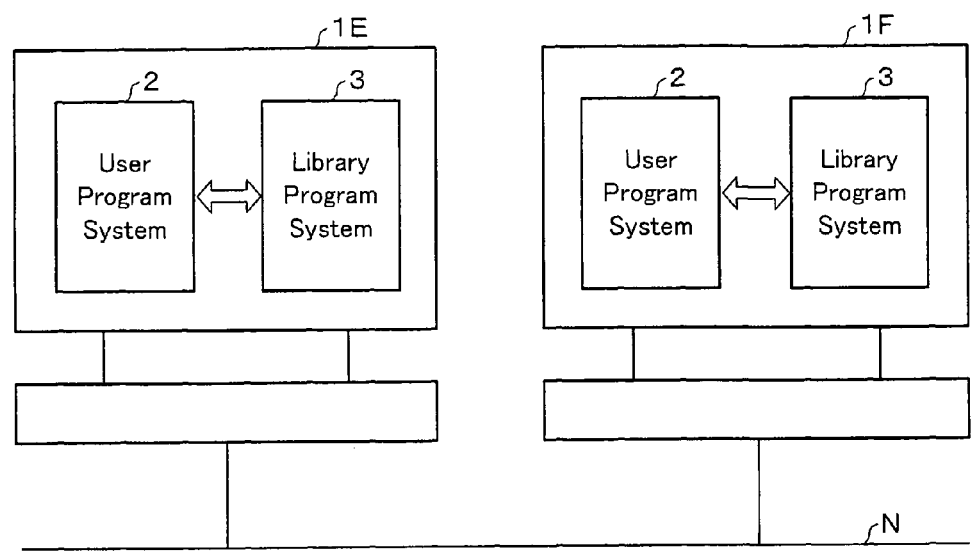
FIG. 8 is a block diagram illustrating a construction example which accommodates both a plurality of user program systems and a plurality of library program systems.

System construction example 3 has dealt with one user program system 2 and a plurality of library program systems 3. System construction example 3 may be adapted to deal with a plurality of user program systems 2 and a plurality of library program systems 3 as shown in FIG. 8. In the example shown in the figure, a computer 1E and a computer 1D each include both a user program systems 2 and a library program system 3, the computer 1E and the computer 1F being connected over a communications network N. The processes explained in relation to system construction example 3 above are applicable to this construction.

A Variation: Parallel User Program

The description so far has assumed basically that the user program system 2 executes a serial user program in which processing takes place serially. The user program however may be a parallel program. For example, if the number of parallel processes in the user program system 2 is p, and the number of parallel processes carried out by the library program system 3 is also p, it is preferable to use system construction example 2 discussed above. If the number of parallel processes in the user program system 2 is p, and the number of parallel processes carried out by the library program system 3 is q (≠p), it is preferable to use system construction example 3 discussed above.

As described in the foregoing, the computing method in accordance with the present invention is a computing method for a computing system containing a user program system executing a user program and a library program system executing library programs to be used in the user program. The method involves: the first transfer step of the user program system transferring process-target data which will be subjected to computation to the library program system; the second transfer step of the user program system receiving, from the library program system, process-result data representing results of the computation on the process-target data; and the computation instruction step and the computing step carried out between, and independently from, the first and second transfer steps, in the computation instruction step, the user program system instructs the library program system on content of the computation by means of a character string; and in the computing step, the library program system analyzes the character string to determine types of library programs to be used in the computation and an execution sequence of those library programs and executes the determined library programs in the determined execution sequence to carry out the computation on the process-target data.

The computing system in accordance with the present invention (for example, computing system 1), as described in the foregoing, is a computing system containing a user program system executing a user program (for example, user program system 2) and a library program system executing library programs to be used in the user program (for example, library program system 3). The user program system includes: first transfer means (for example, numerical data transfer section 22A) for transferring process-target data which will be subjected to computation to the library program system; second transfer means (for example, computation-result receiving section 22C) for receiving, from the library program system, process-result data representing results of the computation on the process-target data; and computation request means (for example, computation request section 22B) for instructing the library program system on content of the computation by means of a character string, independently from the transfer of the process-target data and the process-result data, the library program system including computing means (for example, computing section 32) analyzing the character string to determine types of library programs to be used in the computation and an execution sequence of those library programs and executing the determined library programs in the determined execution sequence to carry out the computation on the process-target data.

In this arrangement, the processes of transferring the process-target data, instructing on the content of the computation, and transferring the process-result data are carried out separately. Thus, the user program can be constructed containing separate sets of instructions for the individual processes. Therefore, the user program can be divided into segments, which facilitates making changes to the process-target data and the content of the computation. The divisibility of the user program is also useful when an error has occurred, because it becomes easier to locate where the problem has occurred.

The library program system analyzes the character string representing the content of the computation, determines the types of library programs to be used and an execution sequence of those library programs, and executes the library programs on the basis of those types and sequence. In instructing on the content of the computation, the user program system has only to transmit the character string representing the content of the computation to the library program system. The user program does not need to instruct which library program to use.

Therefore, the user program does not need to consider specific processes carried out by the library program system. The user of the user program can use library program more easily without having to know details of the processes carried out by the library program system.

Furthermore, the library program system analyzes the character string representing the content of the computation so as to execute suitable library programs. Therefore, the character string representing information on the content of the computation can be written in any syntax that is not bounded by the following programming languages: i.e., the programming language in which those parts of the user program which implement the transfer of the process-target data and the process-result data are written and the programming languages in which the library programs are written.

As a result, even if the programs for implementing the processes or the library program is changed, the user of the user program can make a request with the library program system for computation without changing the character string representing the information on the content of the computation. That further facilitates the use of the library programs.

In addition, the library program system determines a suitable library program by analyzing the character string representing the content of the computation. If the library programs are modified or a new library program is added, the user program end does not need to know of the changes or additions at all. The library program system end automatically select suitable library programs. In other words, if library program system is changed, the user program does not need to be changed and is still compatible. In addition, when such a system introduced, the old library programs can still be used as they are.

In addition, the user program system does not need to be involved in the computation executed by the library program system. That allows for reduction in size of the user program in the user program system and in the size of memory used in the user program system.

The user program system may contain three user programs that make access to the same library program system: for example, programs for transferring the process-target data, instructing on the content of the computation, and transferring the process-result data.

The computing means may determine the library programs used in the computing, the behavior of the library programs, and the execution sequence of the library programs in reference to the results of the analysis of data structure (data format) of the process-target data or the information representing the data structure transmitted along with the process-target data, as well as the result of the analysis of the character string.

In this arrangement, when the data structure of the process-target data is changed, the library programs to be used in the computation, the behavior of the library programs, or their execution sequence are changed in accordance with the changes in the data structure without changing the character string representing the content of the computation. Therefore, the process-target data, the content of the computation, etc. can be readily changed when compared with an arrangement in which when the data structure of the process-target data is changed, instructions to the library program system on the computation are changed in accordance with the changes.

Alternatively, the computing system (for example, computing system 1) in accordance with the present invention is characterized as follows. The system is a computing system containing a user program system executing a user program (for example, user program system 2) and a library program system executing library programs to be used in the user program (for example, library program system 3). The user program system includes: input value transfer means (for example, numerical data transfer section 22A) for, when the user program is to implement a process for the library program system to carry out computation, implementing a process of transferring input value information on input values for the computation to the library program system; computation request means (for example, computation request section 22B) for implementing a process of transferring, to the library program system, computation request information as information on content of the computation carried out in the library program system; and computation-result receiving means (for example, computation-result receiving section 22C) for implementing a process of receiving, from the library program system, results of execution of the library programs in the library program system. The library program system includes: input value receiving means (for example, numerical data receiving section 41A) for implementing a process of receiving, from the user program system, the input value information on the input values for the computation which is used in the execution of the library programs; computing method determining means (for example, computing method determining section 41B) for implementing a process of analyzing the computation request information sent from the user program system, so as to determine types of library programs to be used and an execution sequence of those library programs; and computation-result transmitting means (for example, computation-result transmitting section 41C) for implementing a process of transmitting the results of the execution of the library programs to the user program system.

Alternatively, the computing method in accordance with the present invention is characterized as follows. The method is a computing method for a computing system containing a user program system executing a user program and a library program system executing library programs to be used in the user program. The user program system carrying out: the input value transfer step of, when the user program is to implement a process for the library program system to carry out computation, implementing a process of transferring input value information on input values for the computation to the library program system; the computation request step of implementing a process of transferring, to the library program system, computation request information as information on content of the computation carried out in the library program system; and the computation-result receiving step of implementing a process of receiving, from the library program system, results of execution of the library programs in the library program system. The library program system carrying out: the numerical data receiving step of implementing a process of receiving, from the user program system, the input value information on the input values for the computation which is used in the execution of the library programs; the computing method determining step of implementing a process of analyzing the computation request information sent from the user program system, so as to determine types of library programs to be used and an execution sequence of those library programs; and the computation-result transmitting step of implementing a process of transmitting the results of the execution of the library programs to the user program system.

According to the arrangement and method, the user program system executes a user program. When the user program utilizes library programs, the following three processes take place. First, the user program system transfers the input value information on input values for the computation to the library program system. Secondly, the user program system transfers the information on the content of the computation to the library program system so that the library program system can decide the types of library programs to be used and their execution sequence. Thirdly, the library program system transfers results of the execution to the user program system in accordance with a request from the user program system.

The process of transferring the input value information, the process of transferring the information on the content of the computation, and process of transferring the results of the computation are implemented separately as above. Thus, the user program can be constructed containing separate sets of instructions for the individual processes. Therefore, the user program can be divided into segments, which facilitates making changes to the input values and the content of the computation. The divisibility of the user program is also useful when an error has occurred, because it becomes easier to locate where the problem has occurred.

The library program system analyzes the content of the computation which the library program system has received. From the analysis are determined the types of library programs to be used and an execution sequence of those library programs. The library program system executes the library programs based on the determined types and sequence. The user program system hence has to inform the library program system only of what computation to execute, not of which library programs to use. Therefore, the user program does not need to consider specific processes carried out by the library program system. Thus, the user of the user program can use library program more easily without having to know details of the processes carried out by the library program system.

Furthermore, the library program system analyzes the computation request information so as to execute suitable library programs. The library program system is therefore compatible with the user program, in whichever programming language the program is written.

If the library programs are modified or a new library program is added, the user program end does not need to know of the changes or additions at all. The library program system end automatically use suitable library programs. In other words, if the library program system is changed, the user program does not need to be changed and is still compatible. In addition, when such a system is introduced, the old library programs can still be used as they are.

In addition, the user program system does not need to be involved in the computation executed by the library program system. That allows for reduction in size of the user program in the user program system and in the size of memory used in the user program system.

The user program system may contain three user programs that make access to the same library program system: for example; an input data transfer program, a process request program, and a result fetching program.

The computing system in accordance with the present invention, in the above-mentioned arrangement, may be arranged so that the input value transfer means transfers numerical data and a format thereof as the input value information.

According to the arrangement, numerical data and its format are transferred as the input value information to the library program system. Thus, the information on the content of the computation does not need to include information on the data format of the input value. That readily enables, for example, combining of user programs which manipulate different data formats.

The computing system in accordance with the present invention, in the above-mentioned arrangement, may be arranged so that: the input value receiving means stores the received input value information in the memory section (for example, memory section 33); and the computing method determining means determines which of the input value information stored in the memory section to use in the execution of the library programs.

According to the arrangement, if the process of transferring the input value information is divided from the process of transferring the information on the content of the computation, the processes can be combined in a suitable manner for the computation by the library programs.

The computing system in accordance with the present invention, in the above-mentioned arrangement, may be arranged so that the computation request means transfers a character string representing the content of the computation as the information on the content of the computation. According to the arrangement, the information on the content of the computation is a character string. Besides, the computing method determining means in the library program system analyzes the character string and executes suitable the library programs in a suitable sequence.

Therefore, the character string representing the information on the content of the computation can be written in any syntax that is not bounded by the following programming languages: i.e., the programming language in which those parts of the user program which realize the input value transfer means and the computation-result receiving means are written and the programming languages in which the library programs are written. As a result, even if the library programs and the programs for realizing the input value transfer means and the computation-result receiving means are changed, the user of the user program can make a request with the library program system for computation without changing the character string representing the information on the content of the computation. That further facilitates the use of the library programs.

The computing system in accordance with the present invention, in the above-mentioned arrangement, may be arranged so that the computation request means transfers a character string representing a mathematical equation per se as the information on the content of the computation.

According to the arrangement, the user program system end only has to transfers a character string representing a mathematical equation per se to the library program system. The user program system does not need to consider how equations should be solved, for example. Therefore, the user of the user program can write programs without considering specific method of solving.

The computing system in accordance with the present invention, in the above-mentioned arrangement, may be arranged so that the user program system and the library program system operate on a single computer.

According to the arrangement, the user program system and the library program system can be built on a single computer. Thus, the foregoing computing system can be realized. That single computer may contain a plurality of computing devices (for example, CPUs) which share common memory.

The computing system in accordance with the present invention, in the above-mentioned arrangement, may be arranged so that the user program system operates on a first computer and the library program system operates on another computer communicably connected to the first computer.

According to the arrangement, the user program system and the library program system operate on different computers. That enables parallel execution of the user program and the library program.

The computing system in accordance with the present invention, in the above-mentioned arrangement, may be arranged so that there are provided a plurality of computers on which the library program system operates.

According to the arrangement, the library programs can be executed on a plurality of computers. The computation can be carried out more quickly.

The computing system in accordance with the present invention, in the above-mentioned arrangement, may be arranged so that the input value transfer means and the computation request means transfer the input value information and the information on the content of the computation to one of the computers on which the library program system operates; and the computing method determining means, in the library program system, which receives the input value information and the information on the content of the computation determines how to share the computation and transfers computation content shares of the other computers.

According to the arrangement, one of the computers on which the library program system operates determines the sharing of the computation. The user program system end therefore does not at all need to consider how to share the computation. In other words, the user of the user program does not need to write programs while considering parallel processes. That eliminates the need for programming in accordance with the system arrangement.

The computing system in accordance with the present invention, in the above-mentioned arrangement, may be adapted so that the input value transfer means and the computation request means transfer the input value information and the information on the content of the computation to one of the computers on which the library program system operates; the computing method determining means, in the library program system, which receives the input value information and the information on the content of the computation determines how to share the computation and transmits a result of the sharing method to the user program system; and the computation request means transfers the computation request information to the computers on the basis of the received result of the sharing method and the input value transfer means transfers the input value information to the computers on the basis of the sharing method of the computation.

According to the arrangement, one of the computers on which the library program system operates determines the sharing of the computation. The user program system end has only to transfer the computation request information and the input value information on the basis of a result of the sharing method. In other words, the user of the user program does not need to write programs while considering parallel processes. That eliminates the need for programming in accordance with the system arrangement.

In this manner, the computing system and method in accordance with the present invention separately carries out the process of transferring the input value information (process of transferring the process-target data), the process of transferring the information on the content of the computation (process of instructing on the content of the computation), and the process of transferring the results of the computation (process of transferring the process-result data). The user program can be constructed containing separate sets of instructions for the individual processes. Therefore, the user program can be divided into segments, which facilitates making changes to the input value (process-target data) and the content of the computation.

The present invention is not limited to the description of the embodiments above, but may be altered by a skilled person within the scope of the claims. An embodiment based on a proper combination of technical means disclosed in different embodiments is encompassed in the technical scope of the present invention.

INDUSTRIAL APPLICABILITY

The computing system in accordance with the present invention is applicable to, for example, computation in science and technology fields by utilize existing library programs.

The invention claimed is:

1. A computing method for a computing system containing a user program system executing a user program and a library program system executing library programs to be used in the user program,
the user program system operating on a first computer and the library program system operates on the first computer or on at least one computer communicably connected to the first computer, the at least one computer being different from the first computer, said method comprising:

a first transfer step of the user program system transferring process-target data which will be subjected to computation to the library program system;

a second transfer step of the user program system receiving, from the library program system, process-result data representing results of the computation on the process-target data; and a computation instruction step and a computing step carried out between, and independently from, the first and second transfer steps, wherein in the computation instruction step, the user program system instructs the library program system on content of the computation by means of a character string which is written in a syntax different from (i) that of a programming language in which a program for executing the first and second transfer steps is written, and (ii) that of a programming language in which a library program is written; and in the computing step, the library program system analyzes the character string to determine types of library programs to be used in the computation and an execution sequence of those library programs and executes the determined library programs in the determined execution sequence to carry out the computation on the process-target data, wherein in a case where the library program system is configured to determine how to share the computation and to transmit a result of the sharing method to the user program system, the user program system is configured to transfer input value information to the at least one computer on the basis of the sharing method of the computation.

2. A computing system comprising:
a user program system for executing a user program; and a library program system for executing library programs to be used in the user program, the user program system operating on a first computer and the library program system operates on the first computer or on at least one computer communicably connected to the first computer, the at least one computer being different from the first computer, the user program system including a numerical data transfer section for transferring process-target data which will be subjected to computation to the library program system;

a computation-result receiving section for receiving, from the library program system, process-result data representing results of the computation on the process-target data; and a computation request section for instructing the library program system on content of the computation by means of a character string, independently from the transfer of the process-target data and the process-result data, the character string being written in a syntax different from (i) that of a programming language in which a program for executing the first and second transfer steps is written, and (ii) that of a programming language in which a library program is written, the library program system including a computing section for analyzing the character string to determine types of library programs to be used in the computation and an execution sequence of those library programs and executing the determined library programs in the determined execution sequence to carry out the computation on the process-target data, wherein in a case where a computing method determining section in the library program system is configured to determine how to share the computation and to transmit a result of the sharing method to the user program system, in the user program system, the numerical data transfer section is configured to transfer input value information to the at least one computer on the basis of the received result of the sharing method.

3. The computing system of claim 2, wherein there are provided a plurality of computers on which the library program system operates.

4. The user program system contained in the computing system of claim 2.

5. The library program system contained in the computing system of claim 2.

6. A non-transitory computer-readable storage medium, on which a program is stored,
the program causing a computer to perform functions of each section contained in the user program system of claim 4.

7. A non-transitory computer-readable storage medium, on which a program is stored,
the program causing a computer to perform functions of each sections of the computing section contained in the library program system of claim 5.

8. A computing system comprising:
a user program system for executing a user program; and
a library program system for executing library programs to be used in the user program,
the user program system including
a numerical data transfer section for, when the user program is to implement a process for the library program system to carry out computation, implementing a process of transferring input value information on input values for the computation to the library program system;
a computation request section for implementing a process of transferring, to the library program system, computation request information as information on content of the computation carried out in the library program system; and a computation-result receiving section for implementing a process of receiving, from the library program system, results of execution of the library programs in the library program system; and
the library program system including
a numerical data receiving section for implementing a process of receiving, from the user program system, the input value information on the input values for the computation which is used in the execution of the library programs;
a computing method determining section for implementing a process of analyzing the computation request information sent from the user program system, so as to determine types of library programs to be used and an execution sequence of those library programs; and
a computation-result transmitting section for implementing a process of transmitting the results of the execution of the library programs to the user program system, wherein
the user program system operates on a first computer and the library program system operates on the first computer or on at least one computer communicably connected to the first computer, the at least one computer being different from the first computer,
the numerical data transfer section and the computation request section are configured to transfer the input value information and the information on the content of the computation to the at least one computer on which the library program system operates, in a case where the computing method determining section, in the library program system, which is configured to receive the input value information and the information on the content of the computation, is configured to determine how to share the computation and to transmit a result of the sharing method to the user program system, the numerical data transfer section is configured to transfer input value information to the at least one computer on the basis of the received result of the sharing method, and the computation request information is a character string which is written in a syntax different from (i) that of a programming language in which a program for executing the process of transferring the input value information and the process for receiving transfer and the results of execution of the library programs and (ii) that of a programming language in which the library programs are written.

9. The computing system of claim 8, wherein the numerical data transfer section transfers numerical data and a format thereof as the input value information.

10. The computing system of claim 8, wherein:
the numerical data receiving section is configured to store the received input value information in the memory section; and the computing method determining section is configured to determine which of the input value information stored in the memory section to use in the execution of the library programs.

11. The computing system of claim 8, wherein the computation request section is configured to transfer a character string representing the content of the computation as the information on the content of the computation.

12. The computing system of claim 8, wherein the computation request section is configured to transfer a character string representing a mathematical equation per se as the information on the content of the computation.

13. The user program system contained in the computing system of claim 8.

14. The library program system contained in the computing system of claim 8.

15. A computing method for a computing system containing a user program system executing a user program and a library program system executing library programs to be used in the user program,
the user program system operating on a first computer and the library program system operates on the first computer or on at least one computer communicably connected to the first computer, the at least one computer being different from the first computer,
said method comprising:
the user program system carrying out an input value transfer step of, when the user program is to implement a process for the library program system to carry out computation, implementing a process of transferring input value information on input values for the computation to the library program system;
a computation request step of implementing a process of transferring, to the library program system, computation request information as information on content of the computation carried out in the library program system; and a computation-result receiving step of implementing a process of receiving, from the library program system, results of execution of the library programs in, the library program, system; and the library program system carrying out a numerical data receiving step of implementing a process of receiving, from the user program system, the input value Information on the input values for the computation which is used in the execution of the library programs;

a computing method determining step of implementing a process of analyzing the computation request information sent from the user program system, so as to determine types of library programs to be used and an execution sequence of those library programs; and a computation-result transmitting step of implementing a process of transmitting the results of the execution of the library programs to the user program system, wherein the user program system is configured to transfer the input value information and the information on the content of the computation to the at least one computer on which the library program system operates, in a case where the library program system, which is configured to receive the input value information and the information on the content of the computation, is configured to determine how to share the computation and to transmit a result of the sharing a result of the sharing method to the user program system, the user program system is configured to transfer input value information to the at least one computer on the basis of the received result of the sharing method, and the computation request information is a character string which is written in a syntax different from (i) that of a programming language in which a program for executing the process of transferring the input value information and the process for receiving transfer and the results of execution of the library programs and (ii) that of a programming language in which the library programs are written.

* * * * *